United States Patent [19]
Huang et al.

[11] Patent Number: 5,333,214
[45] Date of Patent: Jul. 26, 1994

[54] APPARATUS FOR REDUCING MAGNETIC FIELD-INDUCED BIAS ERRORS IN A FIBER OPTIC GYROSCOPE

[75] Inventors: Sidney X. Huang, West Hills; Ronald J. Michal, Wrightwood; Ralph A. Patterson, Moorpark; George A. Pavlath, Thousand Oaks, all of Calif.

[73] Assignee: Litton Systems, Inc., Beverly Hills, Calif.

[21] Appl. No.: 17,678

[22] Filed: Feb. 12, 1993

[51] Int. Cl.$^5$ .................................................. G01B 9/02
[52] U.S. Cl. ...................................... 385/12; 385/13; 385/123; 324/244.1; 356/350
[58] Field of Search .......................... 385/12, 13, 123; 356/350; 242/7.03; 324/96, 244.1

[56] References Cited

U.S. PATENT DOCUMENTS

| | | | |
|---|---|---|---|
| 4,743,115 | 5/1988 | Arditty et al. | 356/350 |
| 4,793,708 | 12/1988 | Bednarz | 356/350 |
| 5,168,539 | 12/1992 | Negishi et al. | 356/350 X |

OTHER PUBLICATIONS

"Drift of an Optical Fiber Gyroscope Caused by the Faraday Effect and Its Reduction by Use of a Polarizing Fiber", Hotate et al, Optica Acta, 1986, vol. 33, No. 12, pp. 1553–1561.

"Drift of an Optical Fiber Gyroscope Caused by the Faraday Effect: Experiment", Hotate et al, Journal of Lightwave Technology, vol. LT-5, No. 7, Jul. 1987, pp. 997–1001.

*Primary Examiner*—Rodney B. Bovernick
*Assistant Examiner*—Hemang Sanghavi
*Attorney, Agent, or Firm*—Elliott N. Kramsky

[57] ABSTRACT

Apparatus for suppressing the bias errors induced by the Faraday effect in the output of a sensor coil exposed to a magnetic field. Arrangements are formed at two leads of the sensor coil for compensating the bias shifts. One of such arrangements comprises at least one loop of optical fiber for compensating the effect induced by the magnetic field component oriented transverse to the axis of the sensor coil while the other comprises at least one loop oriented at a predetermined pitch angle for compensating the effect induced by a magnetic field component along the axis. In each case, a predetermined degree of twist of a preselected fiber twist mode is imposed upon the compensator loop for creating a counteracting, corrective Faraday effect. Cross-coupling does not occur between the two compensators as their twist rate perodicities are unequal.

13 Claims, 3 Drawing Sheets

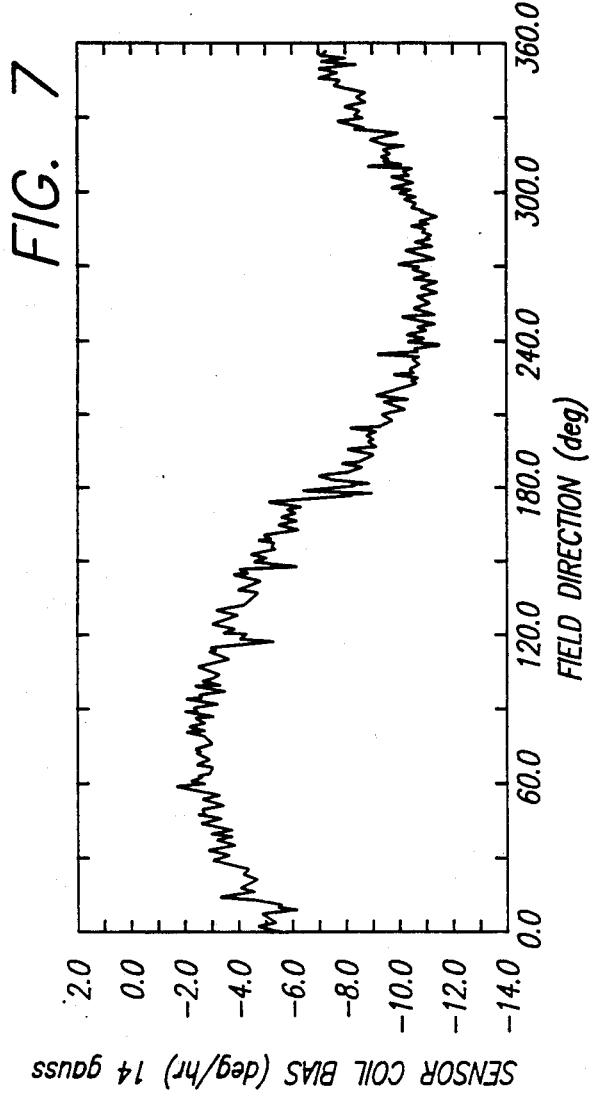
FIG. 7
FIG. 5
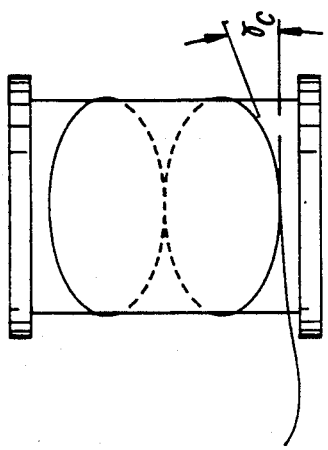
FIG. 6
| COMPENSATOR CONSTRUCTION | | COMPENSATOR SENSITIVITY | NET SENS. = COIL+COMP. |
|---|---|---|---|
| LOOPS | TWISTS | deg/hr-gauss | deg/hr-gauss |
| 1 | 3 | 0.9 | 0.26 |
| 1 | 4 | 1.06 | 0.12 |
| 1 | 5 | 1.36 | -0.18 |
| 3 | 4 | 1.39 | -0.21 |
| 2 | 4 | 0.9 | 0.26 |
SENSOR COIL AXIAL SENSITIVITY = 1.18 deg/hr-gauss

APPARATUS FOR REDUCING MAGNETIC FIELD-INDUCED BIAS ERRORS IN A FIBER OPTIC GYROSCOPE

BACKGROUND

1. Field of the Invention

The present invention relates to fiber optic gyroscopes. More particularly, this invention pertains to apparatus for suppressing bias errors induced by magnetic fields oriented both transverse and axially with respect to the gyroscope sensor coil.

2. Description of the Prior Art

Fiber optic rotation sensing devices, such as gyroscopes, comprise two main components, (1) a front end including a light source and detector and (2) a fiber optic interferometer, including sensor coil, coupler and polarizer that are mounted to a system. Light from the source is split by the coupler into two beams, each of which is coupled into an opposed lead of the sensing coil. The interferometer and associated electronics process the phase relationship between the two interfering, counter-propagating beams of light when they emerge from opposite leads of the coil and are combined. A phase shift difference between the two beams results from (1) coil rotation and (2) so-called "environmental" factors.

Environmental factors include such variables as temperature, vibration (both acoustical and mechanical) and magnetic fields (Faraday effects). These factors can induce phase shifts between the counter-propagating beams that are indistinguishable from those induced by rotation. In the event that the sensing loop is of ideal single mode fiber, the Faraday effect is cancelled when the light travels through the fiber coil and a phase difference between the counterpropagating beams is not generated. The phase difference is observed, due to the nonreciprocity of the Faraday effect, when retarders are located asymmetrically within the fiber loop. Fiber twist, occurring naturally during manufacture or induced during the winding of the coil, acts as an actual and inevitable retarder that leads to bias drift in the presence of a magnetic field. One common method for avoiding the influence of magnetic fields is to place the sensor coil in a $\mu$-metal housing. This solution is affected at the cost of an increase in both the weight and cost of the fiber optic gyro.

The Faraday effect in fiber loops is discussed in articles by Kazuo Hotate and Kunio Tabe ("Drift of an Optical Fiber Gyroscope Caused by the Faraday Effect: Influence of the Earth's Magnetic Field," *Applied Optics*, Vol. 25 No. 7 (Apr. 1, 1987) pp. 1086–1092 and "Drift of an Optical Fiber Gyroscope Caused by the Faraday Effect: Experiment," *Journal of Lightwave Technology*, Vol. LT-5, No. 7 (July 1987) pp. 997–1001). Hotate and Tabe discuss a relationship between the bias and drift of the fiber optic gyro (FOG) due to transversely-directed magnetic fields (i.e. fields substantially in the plane of the loops that, in combination, constitute the sensor coil) and the twisting of the optical fiber. Twisting of the polarization maintaining (PM) optical fiber is unavoidable as mentioned earlier, occurring during various stages of coil construction. Fiber fabrication inevitably imparts some twists. When the spool is then wound from the fiber, the nearly impossible-to-avoid misalignment of the coil winder and the gyro spool axis will produce further twisting. When the axis of the winding machine is at a tilt with respect to the axis of the fiber coil, twist is induced in the coil which is periodic with a twist rate that varies as a sinusoid as the fiber is wrapped about the circumference of the spool Angular misalignments on the order of milliradians can produce magnetic sensitivities on the order of degrees/hour-Gauss. While a large number of twist modes will be generated and randomly distributed within a resulting sensor coil, Hotate and Tabe have found and experimentally verified that (only) the twist component whose twist rate period is equal in fiber length to a loop of the sensor coil is responsible for the sensitivity to transverse magnetic fields.

The above-cited articles are confined to the effect of transverse magnetic fields and, thus, the authors' insights are of limited practical significance. In the real world, both transverse and axial magnetic field components are generally encountered. Hotate et al. suggest that one employ a polarization-maintaining fiber (PM fiber) sensor coil to suppress magnetic field sensitivity. In practice, however, the birefringence of currently-available PM fiber is not sufficiently large to suppress the bias error due to the Faraday effects completely. Bias errors of between 1 and 5 degree/hour-Gauss are normally detected in the output of a FOG having a PM fiber coil.

SUMMARY OF THE INVENTION

The present invention provides twist compensation arrangements by which the bias and drift caused by both axial and transverse magnetic fields may be significantly suppressed.

It addresses the preceding and other shortcomings of the prior art by providing a compensated sensor coil for a fiber optic gyroscope. The coil includes a single mode optical fiber. Such fiber is arranged into a plurality of adjacent coaxial turns. The turns are arranged into a sensor coil that comprises a plurality of adjacent layers. Each of such layers comprises a plurality of adjacent turns, the sensor coil being characterized by a plurality of randomly distributed fiber twist modes.

The fiber is additionally arranged into a compensator adjacent the sensor coil. Such compensator comprises at least one turn of the fiber. The twist rate of a predetermined twist mode of such turn is selected to offset the Faraday effect due to an applied magnetic field having a known orientation with respect to the axis of the sensor coil.

The preceding and other features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIG. 5 is a perspective view of a two turn axial field compensator in accordance with the invention;

FIG. 6 is a table of data for illustrating the effects of varying axial compensator twist rates upon gyro sensitivity;

FIG. 7 is a graph that illustrates the response of a sensor coil (uncompensated) as it is rotated within a transverse magnetic field;

DETAILED DESCRIPTION

Figure 1:
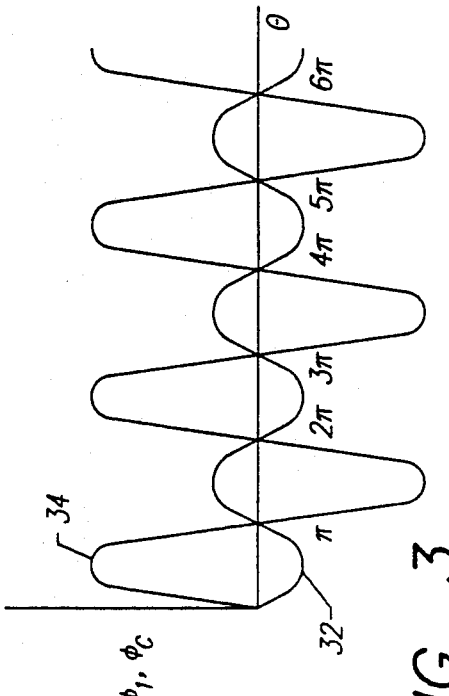
FIG. 1 is a perspective view of a sensor coil in accordance with the invention with fiber coil windings removed for purposes of clarity.

FIG. 1 is a perspective view of a sensor coil 10 in accordance with the invention with fiber coil windings removed for purposes of clarity. The coil 10 includes arrangements for compensating optical phase shifts otherwise induced by the presence of external magnetic fields. As will be seen, compensation can provided for the effects of magnetic field components aligned both with and transverse to the axis of rotation 12 of the generally-cylindrical coil 10. In the latter instance, the magnetic field component also lies substantially within the plane of the loops of optical fiber of the coil 10. (These magnetic field components are labelled $H_A$—with flux directed as at 14— and $H_T$—with flux as at line 16— respectively.)

The coil 10 comprises a single continuous PM optical fiber wound into the generally-cylindrical configuration of FIG. 1. Both symmetrical and non-symmetrical winding patterns may be employed. Symmetrical windings, in which the coil 10 is formed by winding matching patterns in opposite directions from the midpoint of the continuous fiber, minimize the impact of such environmental factors as temperature change upon the output, a source of potential bias in an asymmetrically wound coil. The coil winding process involves the generation of layers of adjacent turns begun from an innermost layer 18 and proceeding in an outwardly radial direction as indicated by 20 until the sensor portion of the coil is completed with the winding of an outermost layer 22. Regular winding patterns for creating the sensor coil 10 may comprise layers of helical turns or such symmetric arrangements as those disclosed in U.S. Pat. No. 4,793,708 of Bednarz covering "Fiber Optic Sensing Coil" and in U.S. Pat. No. 4,856,900 of Ivancevic covering "Quadrupole-Wound Fiber Optic Sensing Coil and Method of Manufacture Thereof". Each of such patents is the property of the Assignee herein.

The sensor coil 10 provides the large number of fiber loops required for creation of a phase difference, measurable through a resultant interference pattern, that is indicative of rotation rate. The coil 10 is generally mounted upon a spool (not shown in FIG. 1) that provides a central core. As an alternative, it may be freestanding with its shape maintained by potting or encapsulating the coil windings with an appropriate adhesive material.

In accordance with the invention, means are provided for compensating the undesired magnetic field-induced optical phase shifts between light beams counterpropagating within the coil 10, such means being either formed from the continuous optical fiber of the sensor coil or from another optical fiber (of, perhaps, different optical characteristics) that has been spliced or otherwise joined to the sensor coil fiber. In order to achieve compensation, the leads of the optical fiber of the sensing coil may be formed into one or two specific bias compensating geometries. Both of such compensators are shown in FIG. 1. These include a transverse field compensator 24 consisting of at least one turn of one lead and an axial field compensator 26 comprising at least one turn of the other lead wound on the sensor coil. The axial compensator 26 has a predetermined angular pitch $\gamma_c$. It will be seen later that the relationship of $\gamma_c$ to the pitch of the sensor coil fiber serves as a design criterion of the present invention. As will become apparent from the following description of the invention, the transverse field compensator 24 compensates or nulls the Faraday effect-induced phase shift that would otherwise be observed in the signal output of the coil sensor 10 when a transversely-oriented magnetic field component $H_T$ is applied while the axial field compensator 26 overcomes the Faraday effect-induced phase shift that would be observed in the output when an axial magnetic field component, $H_A$, is present.

As already mentioned, the invention incorporates one or more compensators in conjunction with an otherwise-conventional sensor coil 10 comprising a plurality of layers of turns of a continuous optical fiber. It will become apparent from the discussion that critical design parameters, such as number and inclination of turns and the fiber twist rate of the compensator, must be preserved to maintain compensator effectiveness. It is, therefore, to be understood that the compensator configurations discussed in detail below are fixed during and throughout the winding process and are maintained by appropriate application of conventional adhesive means such as EPOXY or the like.

Figure 2:
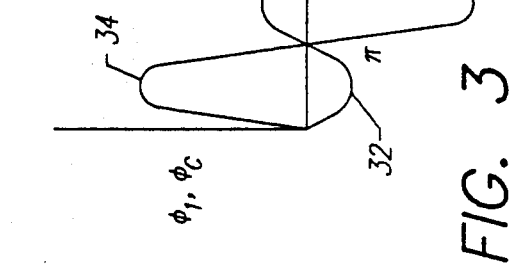
FIG. 2 is a partial schematic diagram of a fiber optic gyroscope that includes a representative fiber loop.

FIG. 2 is a partial schematic diagram of a fiber optic gyroscope that includes a representative fiber loop 30. A coil coordinate system is superimposed thereon to facilitate analysis of the design of the already-illustrated transverse field compensator 24. In this figure, the radius R of the loop 30 represents an average of the radii of the turns of the sensor coil taken from the plurality of concentric layers, each successive layer being characterized by a larger value of R, beginning with the innermost layer 18 and continuing to the outermost layer 22. Representative fiber optic gyro sensor coils may comprise, for example, ten (10) to thirty-six (36) layers of windings, each comprising of about fifty (50) turns of optical fiber. Such figures are intended to be representative only and by no means exhaustive of reasonable sensor coil designs and specific designs will reflect intended applications which will, of course, be affected by accuracy, cost and like requirements.

The design of a compensator in accordance with the invention depends in part upon the twist rate of the selected fiber twist modes. The measured phase shift $\Delta\psi_t$ between clockwise and counterclockwise light beams propagating within the loop 30 in the absence of rotation is initially measured for the purpose of evaluating the twist rate of the relevant fiber mode. In the case of a transverse magnetic field effect, it is the twist rate $\phi_t(\theta)$ of the mode of periodicity $2\pi R$ of the sensing coil that is significant. This is known from the above-referenced findings of Hotate and Tabe. As discussed, the phase shift due to a magnetic field $H_T$ oriented transverse to the axis of rotation 12 of the sensing coil (of which the loop 30 of FIG. 2 is representative) results from the interaction between this specific twist mode and $H_T$. The magnitude, or the rate of twist of such mode $\phi_t(\theta)$ is obtained by analyzing the effect of $H_T$ on $\Delta\psi_t$ in the absence of rotation. It is known that the Faraday rotation $\zeta$ is equal to the product of the strength of the magnetic field applied, $H_T$, and V, the well-known Verdet constant of the optical fiber. The transverse magnetic field will produce phase shifts as follows:

$$\Delta\psi_t = \frac{4\zeta_o R}{\Delta\beta} \int_o^{2m\pi} \theta_t(\theta)\sin(\theta - \theta_o)d\theta \qquad (1)$$

$$\zeta = \zeta_o \sin(\theta - \theta_o) \qquad (2)$$

Where $\Delta\beta$ is the birefringence of the optical fiber, $\zeta_o$ is the Faraday rotation of the fiber and $\Delta\psi_t$ is, as mentioned, the transverse magnetic field-induced phase shift. $\theta_o$ is the direction angle of magnetic field $H_T$ as illustrated in FIG. 2.

Solving each of the above equations for the contributions of the orthogonal components of the transverse magnetic field $H_T$ to the measured phase shift yields:

$$\int_o^{2m\pi} \theta_t(\theta)\sin\theta d\theta = \frac{\Delta\beta}{4\zeta_o R} \Delta\psi_t \bigg|_{\theta_o=0} \qquad (3)$$

$$\int_o^{2m\pi} \theta_t(\theta)\cos\theta d\theta = -\frac{\Delta\beta}{4\zeta_o R} \Delta\psi_t \bigg|_{\theta_o=\pi/2} \qquad (4)$$

The above equations may be solved to demonstrate that $\phi_t(\theta)$ is proportional to the birefringence $\Delta\beta$ and inversely proportional to the product of the radius R and the Verdet constant $\zeta_o$.

A discussion of the design criteria of axial and transverse field compensators will follow. Throughout the discussion it is assumed that the compensator is formed of the same continuous optical fiber as the sensor coil. However, it will be appreciated by those skilled in the art that the teachings provided with reference to such "single fiber" designs may be readily extended to a compensator formed of an optical fiber that has been spliced onto an end of the sensor coil fiber by correction for disparities between the fiber parameters affecting optical properties such as fiber birefringence, Verdet constant and the like along with measurable anamolies introduced by the presence of the optical splices.

Keeping the foregoing caveat in mind, in order to design the transverse field compensator 24, the following equation must be solved:

$$\Delta\psi_t(\theta_o) + \Delta\psi_{tc}(\theta_o) = 0 (\text{all } \theta_o) \qquad (5)$$

Where $\Delta\psi_{tc}$ is the phase shift generated by the compensator and required to counteract that induced by the transverse magnetic field component $H_T$. It is known that the unavoidable presence of a known twist mode in the optical fiber serves as the source of a transverse field-induced bias error. Further, it is known, from the analysis provided by Hotate and Tabe, that such responsible twist mode has twist rate periodicity of $2\pi R$, i.e., equal to the average length of a fiber loop 30 of the sensor coil 10.

Solving equation 5 for the compensator twist rate of the above-identified twist mode leads to the following design criterion for the transverse field compensator 24:

$$\phi_{tc} = \frac{-m}{n} \phi_t(\theta) \qquad (6A)$$

Where m is the total number of turns of the optical fiber of the sensor coil and n is the number of turns of the transverse field compensator 24. Referring to the prior discussion, $\phi_t(\theta)$ may be measured and determined in a straightforward manner by solving equations 1 to 2 in view of the known relationship $\zeta_o = VH$.

Thus, in accordance with the invention, an m-turn sensor coil output that is insensitive to the presence of a transverse magnetic field component (i.e. a component oriented transverse to the axis of rotation 12), is obtained by the addition of a compensator at a fiber lead of the coil windings comprising n fiber turns characterized by a twist mode of twist rate periodicity equal to the average length of the fiber loop. Further, the direction of twist of the compensator coil fiber is opposite to that of the sensor coil fiber. As mentioned earlier, the value of $\phi_t$ is obtained by reference to equations 1 and 2 above after measuring the phase shift $\Delta\psi_t$ induced in the output of the sensor coil (absent rotation) in the presence of a varying transverse magnetic field $H_T$.

Figure 3:
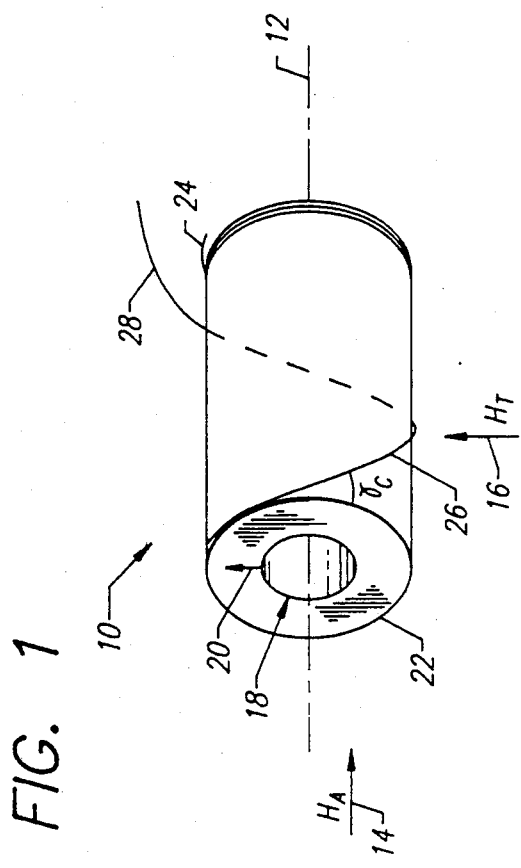
FIG. 3 is a graph of the relationship between the twist rate of a sensor coil and its transverse compensator formed in one of the leads in accordance with the invention.

FIG. 3 is a graph of the relationship between the twist rate of the twist modes of the sensor coil and the transverse compensator whose periodicity is equal to the fiber length of a loop. An m:n ratio of 5:1 is assumed. For convenience, a one-turn compensator with a square-function type twist rate can be created by twisting one fiber lead at a positive constant rate during the first half turn and at a negative constant rate during the second half turn. The twist rate required to compensate the transverse sensitivity in such a case is:

$$\phi_{tc} = m\pi\phi_t'/4 \qquad (6B)$$

Where $\phi_t'$ is the maximum of the measured twist rate $\phi_t(\theta)$ of the sensing coil.

The inventors have expanded the design of the magnetic field bias compensator beyond one based upon the theory of Hotate and Tabe. In addressing the phase shift due to an axially-directed magnetic field component, $H_A$, they have realized a further theoretical insight upon which design of the axial compensator is based. As before, the inventors have found that it is the presence of twist modes in the continuous PM optical fiber that serves as the source of the bias. Unlike the phase shift occasioned by the presence of a transversely-directed magnetic field component $H_T$, they have found that it is the twist mode of twist rate period equal to twice the fiber length of a wound layer that is responsible for the bias error observed in the presence of an axially-directed magnetic field.

In the case of an axial field, the direction of the field is nearly perpendicular to the plane of the sensing loop. While it would seem that such a magnetic field should produce a Faraday effect without effect on the gyro output, the inventors have found that an axial magnetic fields do, in fact, affect the gyro output considerably.

For a practical FOG comprising many turns or loops of PM fiber, the approximation that $\Delta\beta >> \phi, \zeta$ holds, allowing one to approximate the equation for a sensing coil as:

$$\Delta\psi_a = \frac{4\zeta_o}{\Delta\beta} \int_0^L \phi_a(z) \cdot \gamma(z) dz \quad (7)$$

Where $\phi_a$ is the twist rate responsible for axial field sensitivity, L is the fiber length of the sensing loop, and $\gamma(z)$ is the pitch angle of the sensing coil. The pitch angle is constant for the fiber within a layer but of opposite sign for adjacent layers. A constant twist will result in zero axial magnetic field-induced phase shift as the sign of the pitch angle changes: As a consequence, any phase "picked up" at one layer will be cancelled by the next layer since the integral in equation 7 will equal zero. The only factor that can produce a significant degree of axial magnetic field sensitivity is the fiber twist component having a period equal to the total fiber length of two layers.

The above analysis of the inventors may be employed to design twist compensators for offsetting bias error due to axial magnetic fields, thereby reducing overall magnetic sensitivity. Such a compensator consists of a twisted section of fiber lead comprising at least one loop the coil of twist and spatial periodicity equal to the twist spectrum in the coil. Typically the twist in the sensing coil is not known and, therefore, the axial sensitivity must be measured. The twist rate of the coil may be evaluated by applying the following equation:

$$\phi_a = (\Delta\psi_a) \cdot \Delta\beta / (8R\zeta |\gamma| m\pi) \quad (8)$$

Where $\Delta\psi_a$ is the measured phase shift of the sensing coil, R is the radius of the fiber loop and m is the number of turns of the coil. The twist rate of the compensator required to suppress the axial field sensitivity is:

$$\phi_{ac} = -m|\gamma| R\phi_a / (n_c R_c \tan |\gamma_c|) \quad (9)$$

Where $n_c$ is the number of turns of the compensator, $R_c$ is the radius of the compensator loop and $\gamma_c$ is the pitch angle of the compensator fiber. $\gamma_c$ should be made as large as possible to reduce the required number of turns and twist rate.

Figure 4:
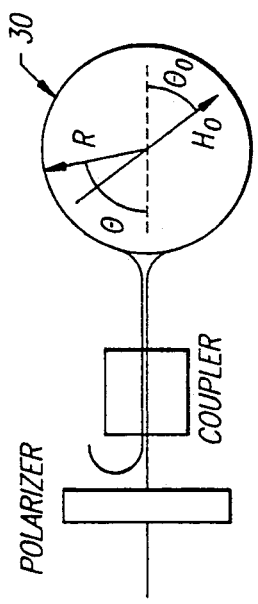
FIG. 4 is a side elevation view of a sensor coil including an axial compensator in accordance with the invention for demonstrating the differing pitch angles of the sensor coil and of the axial compensator.

FIG. 4 is a side elevation view of the sensor coil of FIG. 1 that demonstrates the relationship between the windings of the sensing coil 10 and the compensator loop of the axial field compensator 26. The spool 10 is wound in a helical pattern with a pitch angle $\gamma$ defining the inclination of each turn from a line 36 drawn orthogonal to the axis of rotation 12. The axial compensator loop is inclined at a different angle $\gamma_c$. In contrast to the transverse compensator, the twist rate $\phi_{ac}$ relates to the twist mode of periodicity 2L $_{layer}$ that is, the compensator twist rate is related to the sensor coil twist rate whose period is equal in length to the fiber employed in winding two layers of turns, while $\phi_{tc}(\theta)$ relates to the mode of twist rate periodicity $2\pi R$. Thus the twist rate of the fiber comprising an axial compensator may be reduced by increasing the compensator pitch angle $\gamma_c$ and/or by increasing the number of compensator turns.

FIG. 5 is an illustration of an axial field compensator, unlike the axial field compensator illustrated in FIG. 1 and 4, that comprises two compensator turns or layers as each layer of the compensator comprises a single turn. One may compare the single-turn (or layer) compensator of prior figures with that of FIG. 5, referring to the design equation 9 above to see that the varying configurations indicate alternative approaches to the desirable goal of minimizing the compensator twist rate $\phi_{ac}$. While the axial compensator reduces the required twist rate by increasing $n_c$, the number of compensator turns, both the single and multiple turn compensators as illustrated further attempt to minimize $\phi_{ac}$ by orienting the turn(s) at the maximum $\gamma_c$ permitted by the dimensions of the sensor coil.

Data has been obtained with regard to both axial and transverse field compensation in accordance with the invention. Such data has been generated by means of a test bed that included a 200 m fiber gyro with a broadband light source and an MIOC. The gyro was operated in open-loop fashion with a lock-in amplifier providing demodulation of the gyro signal. The MIOC leads to the fiber coil were oriented perpendicular to the magnetic field (generated by a pseudo-Helmholtz coil capable of selectively generating fields in both the transverse and axial directions.) Compensators were integrated into the test bed by fabrication onto a spool similar to that of the fiber gyro and then splicing the fiber leads to one of the gyro's input leads. The test compensator was then stacked onto the sensor coil to assure that both sensor coil and compensator saw the same uniform magnetic field.

Axial Magnetic Field Compensator

A quadrupole sensor coil winding structure was employed with twist spectrum comprising a twist in one direction (due either to the winding process or intrinsic to the fiber) for one layer followed by a twist in the reverse direction for the adjacent layer. Thus a twist component in the axial direction was assured.

The twist was applied at a constant rate for one compensator loop and then reversed over succeeding loops in creating the multiple loop configurations. The fiber was attached to the spool to prevent relaxation.

Data was obtained by measuring the sensitivity of the sensor coil to an axial magnetic field, integrating a compensator configuration and then measuring the effect upon sensitivity. Different twist rates were employed to establish a baseline. A sensitivity of about 1 deg/hr-Gauss to axial magnetic fields was measured in the uncompensated sensor coil. FIG. 6 is a table of data that summarizes the combined sensitivity of a sensor coil incorporating different compensator designs. It is apparent from such data that the compensators successfully reduced axial sensitivity and, in one case, actually over-compensated. Such data clearly demonstrates the utility of an axial compensator in accordance with the invention.

Transverse Magnetic Field Compensator

Due to the difficulty of fabricating a sinusoidally-varying twist rate into a transverse field compensator, a square wave twist rate was employed, the twist rate was being held constant for half the circumference of the spool and then reversed (same twist rate in the opposite direction) over the remaining half of the circumference. As mentioned earlier, the compensator twist rate can be achieved over more than a single fiber loop as long as the twist components each of loop are in phase. (Additional loops may be added to fine tune the compensator to eliminate residual sensitivity. To determine the twist rate needed for this, sensitivity is measured by placing the coil in a transverse magnetic field and monitoring the bias change that occurs as the coil is rotated through 360 degrees in the plane of the field.)

Figure 8:
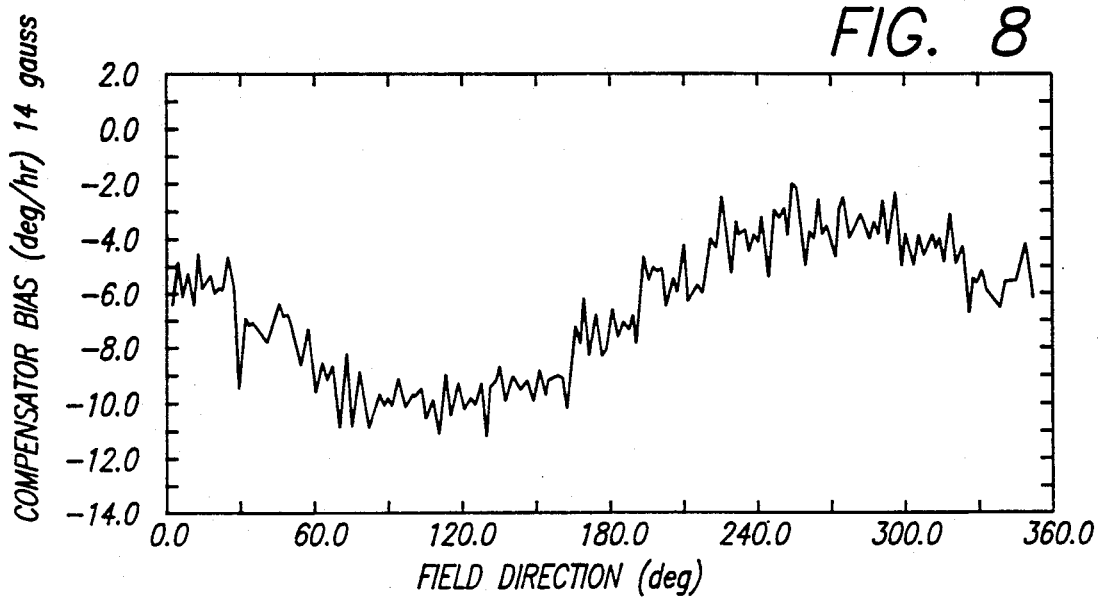
FIG. 8 is a graph of the response of a transverse field compensator (with a square wave twist spectrum) as it is rotated through a magnetic field.

FIG. 7 is a graph of the response of a 200 m fiber as it is rotated in a 14 Gauss field. Maximum bias change was used to determine the maximum twist rate for nulling out field sensitivity. For the particular coil measured, a compensator twist of 1.25 turns over the first half of the circumference and −1.25 turns over the second half of the circumference was employed. The compensator was fabricated on a separate spool and then spliced into the interferometer. The measured compensator response is illustrated in FIG. 8. It can be observed from the graph of FIG. 8 that the response of the square wave twist spectrum approximates the sinusoidal response of the fiber coil as shown in FIG. 7. The coil and the compensator were aligned and then placed in a transverse magnetic field so that their respective responses were 180 degrees out-of-phase.

Figure 9:
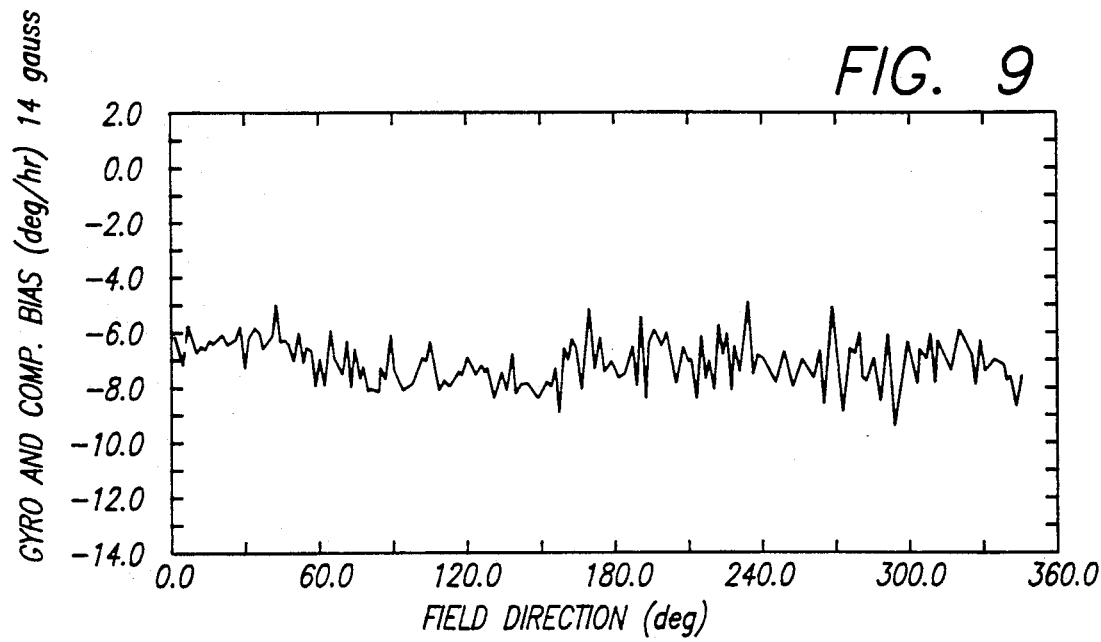
FIG. 9 is a graph of the response of a transverse field compensated sensor coil as it is rotated through a magnetic field.

FIG. 9 is a graph of the response of the combined system to a 14 Gauss transverse field as a function of field orientation. As can be seen, the net magnetic sensitivity was reduced to less than 0.05 deg/hr-Gauss without magnetic shielding. This, of course, can result in significant weigh savings. Additional experiments were conducted to measure cross-coupling among the axial and transverse compensators and the effect on gyro sensitivity. It was found that the transverse compensator did not affect the axial sensitivity of the gyro. Conversely, the observed gyro sensitivity to transverse fields was not affected by the axial compensator.

Thus, the above experiments demonstrate that effective compensators for both axial and transverse magnetic fields can be achieved. The axial sensitivity of a compensated gyro has been shown to be reduced by an order of magnitude over that of the gyro without a compensator. The level of performance could be increased, of course, by improved control over the compensator twist rate. The transverse sensitivity of the gyro with a compensator was less than 0.05 deg/hr-Gauss. This represents almost two orders of magnitude improvement and is equivalent to performance achieved with magnetic shields.

Thus it is shown that the present invention provides apparatus for minimizing the magnetic field-generated bias otherwise observed in the output of a fiber optic gyro. Such bias results from Faraday effect interaction between the magnetic field and the light beams propagating within the sensor coil. By employing the teachings of the invention, the effects of magnetic fields oriented both transversely and axially with respect to the coil geometry are overcome.

While this invention has been illustrated with respect to its presently-preferred embodiment, it is not limited thereto. Rather, this invention is limited only insofar as defined by the following set of patent claims and includes within its scope all equivalents thereof.

What is claimed is:

1. A compensated sensor coil for a fiber optic gyroscope comprising, in combination:
   a) a single mode optical fiber;
   b) said fiber being arranged into a plurality of adjacent, coaxial turns;
   c) said turns being arranged into a sensor coil comprising plurality of adjacent layers, each of said layers comprising a plurality of adjacent turns, said sensor coil being characterized by a plurality of randomly distributed fiber twist modes;
   d) said fiber being additionally forming a compensator adjacent said sensor coil;
   e) said compensator comprising at least one turn of said optical fiber; and
   f) the twist rate of a predetermined twist mode of said at least one turn of said compensator being selected to offset the Faraday effect due to an applied magnetic field having a known orientation with respect to the axis of said sensor coil.

2. A compensated sensor coil as defined in claim 1 further characterized in that the twist rate of said predetermined twist mode of said compensator is a function of the twist rate of the corresponding twist mode of said sensor coil.

3. A compensated sensor coil as defined in claim 2 wherein the direction of twist of said compensator is opposite the direction of twist of said corresponding twist mode of said sensor coil.

4. A compensated sensor coil as defined in claim 3 further characterized in that said predetermined sensor twist mode is of twist rate periodicity equal to the mean length of a loop of optical fiber comprising said sensor coil.

5. A compensated sensor coil as defined in claim 4 wherein the twist rate of said compensator is a function of the number of turns of said sensor coil.

6. A compensated sensor coil as defined in claim 5 wherein the twist rate of said compensator is a function of the number of turns of said compensator.

7. A compensated sensor coil as defined in claim 6 wherein the twist rate of said compensator is directly proportional to the product of the twist rate of said sensor coil, the number of turns and the birefringence of said sensor coil and inversely proportional to the product of the number of turns of the compensator, the radius of the sensor coil and its Verdet constant.

8. A compensated sensor coil as defined in claim 3 further characterized in that said predetermined twist mode is of twist rate periodicity equal to the length of fiber comprising two layers of turns of said sensor coil.

9. A compensated sensor coil as defined in claim 8 wherein the twist rate of said compensator is a function of the pitch angle of said sensor coil.

10. A compensated coil as defined in claim 9 wherein the twist rate of said compensator is a function of the pitch angle of said compensator.

11. A compensated sensor coil as defined in claim 10 wherein the twist rate of said compensator is a function of the number of turns of said sensor coil.

12. A compensated sensor coil as defined in claim 11 wherein the twist rate of said compensator is a function of the number of turns of said compensator.

13. A compensated sensor coil as defined in claim 12 wherein the twist rate of said compensator is a direct function of the product of the number of sensor coil turns, the sensor coil pitch angle, the birefringence of the sensor coil and the sensor coil radius and an inverse function of the product of the number of compensator turns, the radius of the compensator turns, the Verdet constant and the tangent of the compensator pitch angle.

* * * * *